United States Patent
Tanimori et al.

(10) Patent No.: US 11,643,083 B2
(45) Date of Patent: May 9, 2023

(54) INFORMATION PROCESSING APPARATUS, INFORMATION PROCESSING SYSTEM, INFORMATION PROCESSING METHOD, AND INFORMATION PROCESSING PROGRAM FOR DECIDING SPECIFICATIONS OF A PROPOSED VEHICLE

(71) Applicant: Toyota Jidosha Kabushiki Kaisha, Toyota (JP)

(72) Inventors: Shunsuke Tanimori, Nagoya (JP); Ryota Nakabayashi, Toyota (JP); Osamu Izumida, Nagoya (JP); Takeshi Kanou, Seto (JP); Naoki Yamada, Toyota (JP); Kazuyuki Inoue, Nagoya (JP); Shin Sakurada, Toyota (JP); Hiromitsu Fujii, Kariya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 296 days.

(21) Appl. No.: 17/069,231

(22) Filed: Oct. 13, 2020

(65) Prior Publication Data
US 2021/0171047 A1    Jun. 10, 2021

(30) Foreign Application Priority Data

Dec. 6, 2019  (JP) .............................. JP2019-221304

(51) Int. Cl.
| | | |
|---|---|---|
| *B60W 40/08* | (2012.01) | |
| *B60W 30/18* | (2012.01) | |
| *B60W 40/105* | (2012.01) | |
| *B60W 10/18* | (2012.01) | |
| *B60W 10/08* | (2006.01) | |
| *G07C 5/08* | (2006.01) | |

(52) U.S. Cl.
CPC ............ *B60W 40/08* (2013.01); *B60W 10/08* (2013.01); *B60W 10/18* (2013.01); *B60W 30/18127* (2013.01); *B60W 40/105* (2013.01); *G07C 5/0816* (2013.01); *B60W 2540/12* (2013.01)

(58) Field of Classification Search
CPC ...... B60W 40/08; B60W 10/08; B60W 10/18; B60W 30/18127; B60W 40/105; B60W 2540/12; G07C 5/0816; G06Q 30/0282; G06Q 30/0631; G06Q 30/0621; G06Q 10/063; Y02T 10/70; Y02T 10/72
See application file for complete search history.

(56) References Cited

U.S. PATENT DOCUMENTS

2014/0350986 A1* 11/2014 Arnold ............... G06Q 30/0621
                                                                705/26.5
2015/0151637 A1    6/2015 Suzuki et al.

FOREIGN PATENT DOCUMENTS

| JP | 2002-269401 A | 9/2002 |
| JP | 2009-165210 A | 7/2009 |
| JP | 2011-147208 A | 7/2011 |
| JP | 2014-038047 A | 2/2014 |

(Continued)

*Primary Examiner* — Brian P Sweeney
(74) *Attorney, Agent, or Firm* — Dinsmore & Shohl LLP

(57) ABSTRACT

An information processing apparatus includes a controller. The controller decides whether or not specifications of a proposed vehicle to be proposed to a customer are determined such that the specifications are for an electrified vehicle based on traveling data of a vehicle driven by the customer and outputs the decided specifications.

18 Claims, 3 Drawing Sheets

(56) References Cited

FOREIGN PATENT DOCUMENTS

| JP | 2014220655 A | * | 11/2014 | ............... H04N 7/18 |
| JP | 2018-505485 A | | 2/2018 | |
| JP | 2019144948 A | * | 8/2019 | ............. G06Q 50/10 |
| JP | 2019-153128 A | | 9/2019 | |
| WO | 2016-122879 A1 | | 8/2016 | |

* cited by examiner

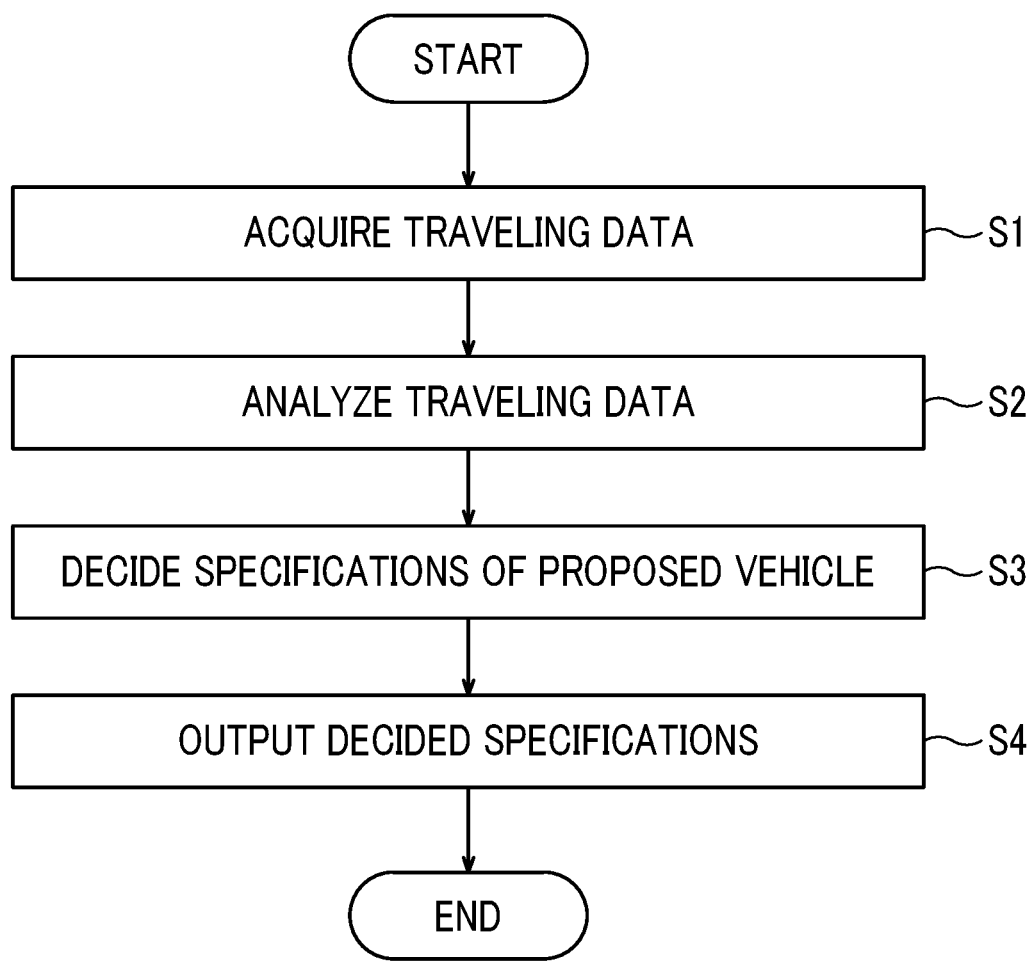

INFORMATION PROCESSING APPARATUS, INFORMATION PROCESSING SYSTEM, INFORMATION PROCESSING METHOD, AND INFORMATION PROCESSING PROGRAM FOR DECIDING SPECIFICATIONS OF A PROPOSED VEHICLE

CROSS-REFERENCE TO RELATED APPLICATIONS

This application claims priority to Japanese Patent Application No. 2019-221304 filed on Dec. 6, 2019, which is incorporated herein by reference in its entirety including the specification, drawings and abstract.

BACKGROUND

1. Technical Field

The present disclosure relates to an information processing apparatus, an information processing system, an information processing method, and an information processing program.

2. Description of Related Art

In the related art, there is a known device used to place an order for an automobile. For example, Japanese Unexamined Patent Application Publication No. 2002-269401 (JP 2002-269401 A) discloses an automobile order receiving and placing device with which a customer can set the specifications of each part of an automobile.

SUMMARY

There is a possibility that specifications set based on the preference of a customer may not be suitable for the way in which the customer causes a vehicle to travel.

The present disclosure provides an information processing apparatus, an information processing system, an information processing method, and an information processing program with which it is possible to make the specifications of a vehicle to be proposed to a customer close to specifications suitable for the way in which the customer causes the vehicle to travel.

A first aspect of the present disclosure relates to an information processing apparatus including a controller. The controller decides whether or not the specifications of a proposed vehicle to be proposed to a customer are determined such that the specifications are for an electrified vehicle based on traveling data of a vehicle driven by the customer and outputs the decided specifications.

A second aspect of the present disclosure relates to an information processing system including the information processing apparatus and a terminal device. The terminal device notifies a user of information relating to the specifications of the proposed vehicle output by the controller of the information processing apparatus.

A third aspect of the present disclosure relates to an information processing method. The information processing method includes deciding whether or not the specifications of a proposed vehicle to be proposed to a customer are determined such that the specifications are for an electrified vehicle by an information processing apparatus based on traveling data of a vehicle driven by the customer and outputting the decided specifications by the information processing apparatus.

A fourth aspect of the present disclosure relates to an information processing program causing an information processing apparatus to perform an operation. The operation includes deciding whether or not the specifications of a proposed vehicle to be proposed to a customer are determined such that the specifications are for an electrified vehicle based on traveling data of a vehicle driven by the customer and outputting the decided specifications.

With the information processing apparatus, the information processing system, the information processing method, and the information processing program according to the aspects of the present disclosure, it is possible to make the specifications of a vehicle to be proposed to a customer close to specifications suitable for the way in which the customer causes the vehicle to travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing a procedure example of an information processing method according to the embodiment.

DETAILED DESCRIPTION OF EMBODIMENTS

In a vehicle dealer, a clerk needs to propose, to a customer, a vehicle having specifications suitable for the way in which the customer causes a vehicle to travel. The clerk in the dealer may select the kind of a prime mover to be installed in a vehicle to be proposed to the customer, as the specifications of the vehicle. The clerk in the dealer may propose, to the customer, at least one of a kind of vehicle in which an engine is installed as a prime mover, a kind of vehicle in which a motor is installed as a prime mover, and a kind of vehicle in which an engine and a motor are installed as prime movers, for example.

Configuration Example of Information Processing System 1

Figure 1:
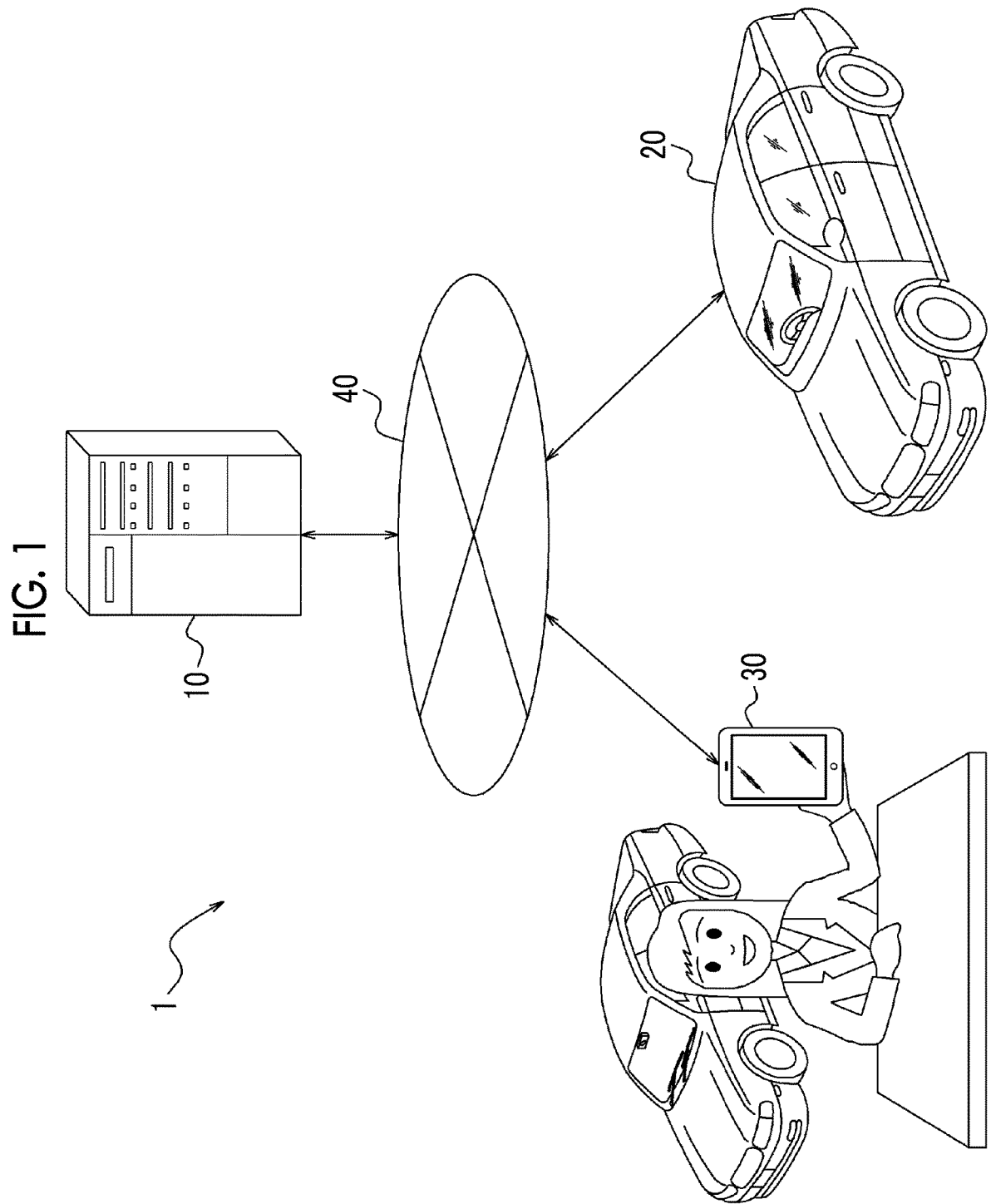
FIG. 1 is a schematic view showing a configuration example of an information processing system according to an embodiment.
Figure 2:
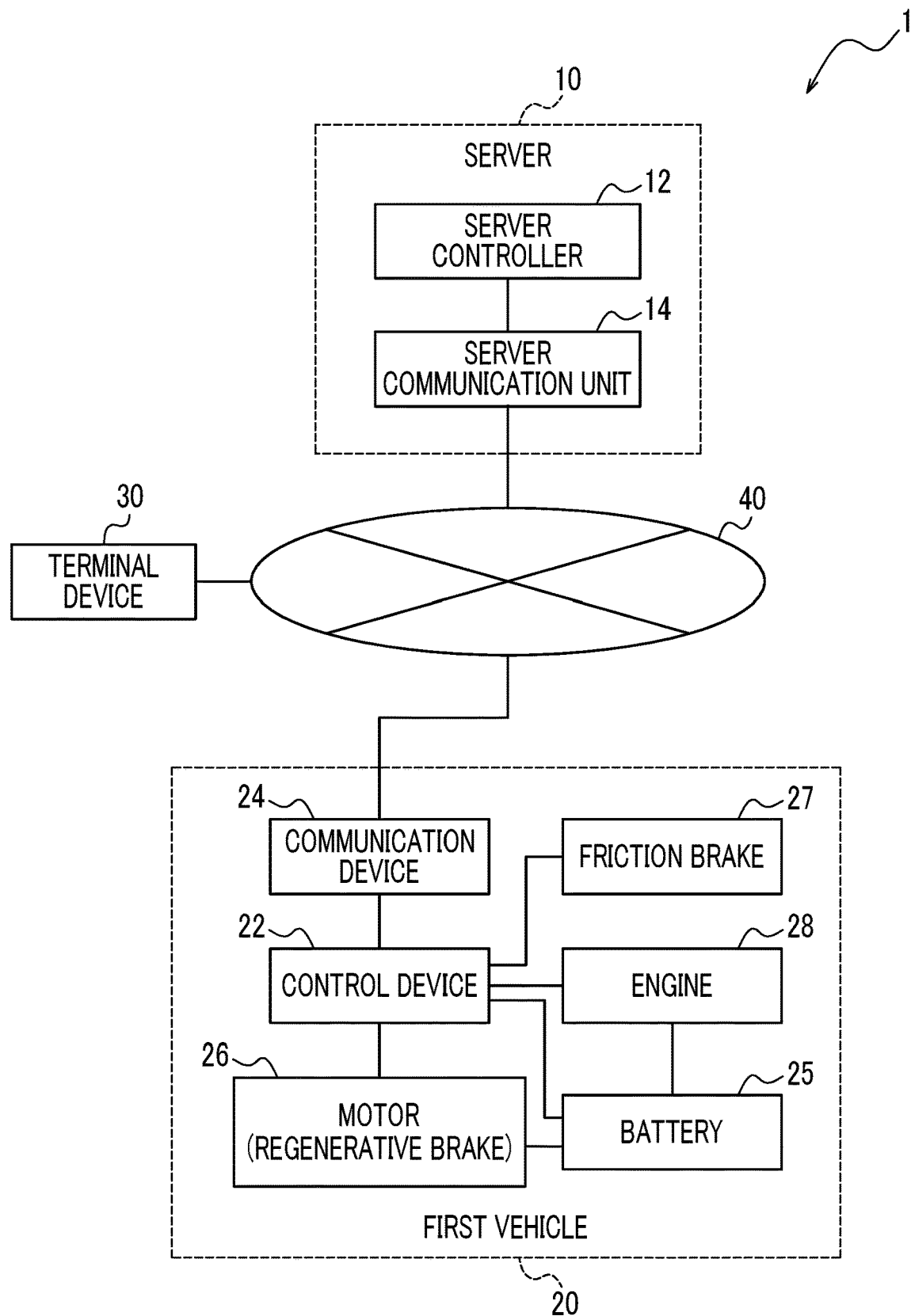
FIG. 2 is a block diagram showing a configuration example of the information processing system according to the embodiment.

As shown in FIGS. 1 and 2, an information processing system 1 according to an embodiment includes a server 10, a first vehicle 20, and a terminal device 30. The first vehicle 20 may also be simply referred to as a vehicle. The server 10, the first vehicle 20, and the terminal device 30 are connected to a network 40. As will be described later, the information processing system 1 may propose, to a customer considering purchasing a vehicle, a vehicle having specifications suitable for the customer based on acquired information or data.

Configuration Example of Server 10

The server 10 is configured to be able to communicate with each of the first vehicle 20 and the terminal device 30. The number of servers 10, the number of first vehicles 20, and the number of terminal devices 30 are not limited to one and may be two or more. The server 10 may also be referred to as an information processing apparatus. The server 10 may include one server apparatus or a plurality of server apparatuses that can communicate with each other.

The server 10 includes a server controller 12 and a server communication unit 14. The server controller 12 may also be simply referred to as a controller. The server controller 12 may include one or more processors. The "processors" in the present embodiment are general-purpose processors, dedicated processors dedicated to a specific process, or the like. However, the processors are not limited thereto. The server controller 12 may include one or more dedicated circuits. The dedicated circuits may include, for example, a field-programmable gate array (FPGA) or an application specific integrated circuit (ASIC). The server controller 12 may include the dedicated circuit instead of the processor and may include the dedicated circuit together with the processor. The server communication unit 14 may include a communication module and may communicate with the first vehicle 20 via the network 40. The server 10 may further include a storage unit. The storage unit is a semiconductor memory, a magnetic memory, an optical memory, or the like. However, the storage unit is not limited thereto. The storage unit may function as a main storage device, an auxiliary storage device, or a cache memory, for example. The storage unit may include an electromagnetic storage medium such as a magnetic disk. The storage unit stores any information used to operate the server 10. For example, the storage unit may store a system program, an application program, or the like.

Configuration Example of First Vehicle 20

The first vehicle 20 includes a control device 22 and a communication device 24. The control device 22 and the communication device 24 are connected to each other such that the control device 22 and the communication device 24 can communicate with each other via a vehicle-mounted network such as a controller area network (CAN) or a dedicated line.

The control device 22 controls each component included in the first vehicle 20. The control device 22 may include one or more processors. The control device 22 may include one or more dedicated circuits instead of the processor and may include one or more dedicated circuits together with the processor. The control device 22 may further include a storage unit.

The communication device 24 is connected to the server 10 such that the communication device 24 can communicate with the server 10 via the network 40. The communication device 24 may be, for example, a vehicle-mounted communication device. The communication device 24 may include a communication module connected to the network 40. The communication module may include a communication module conforming to mobile communication standards such as the 4th Generation (4G) and the 5th Generation (5G) and is not limited thereto.

The first vehicle 20 further includes at least one of a motor 26 and an engine 28. In a case where the first vehicle 20 includes the motor 26 and the engine 28, the first vehicle 20 may also be referred to as a hybrid vehicle. In a case where the first vehicle 20 includes the motor 26 but does not include the engine 28, the first vehicle 20 may also be referred to as an electric vehicle. Regardless of whether or not the first vehicle 20 includes the engine 28, the first vehicle 20 may also be referred to as an electrified vehicle in a case where the first vehicle 20 includes the motor 26.

The control device 22 controls traveling of the first vehicle 20 by controlling the motor 26 or the engine 28.

The first vehicle 20 further includes a friction brake 27 such as a disc brake or a drum brake. The friction brake 27 may be operated in a hydraulic manner. In a case where the first vehicle 20 includes the motor 26, the motor 26 may also function as a regenerative brake. That is, the first vehicle 20 may include a regenerative brake. The first vehicle 20 may include a regenerative brake as a component different from the motor 26. In a case where an operation of applying a brake is performed in the first vehicle 20, the control device 22 may decide whether to operate the regenerative brake or to operate the friction brake 27 based on the state of the first vehicle 20.

The first vehicle 20 may include an anti-lock brake system (ABS). In a case where an operation of applying a brake is performed in the first vehicle 20, the control device 22 decides whether to operate the ABS based on the state of the first vehicle 20. In a case where the control device 22 operates the ABS, the control device 22 causes the friction brake 27 to function without causing the regenerative brake to function.

The first vehicle 20 further includes a battery 25. The battery 25 supplies electric power for driving a starter motor when the engine 28 is started. In a case where the first vehicle 20 includes the motor 26, the battery 25 supplies electric power for driving the motor 26. The battery 25 can be charged with electric power generated by the regenerative brake. Examples of the battery 25 may include, for example, a secondary battery such as a lead storage battery or a lithium ion battery.

Configuration Example of Terminal Device 30

Examples of the terminal device 30 may include a personal computer (PC) such as a desktop PC, a notebook PC, and a tablet PC, and a portable terminal such as a smartphone. The terminal device 30 is connected to the server 10 in a wired manner or a wireless manner such that the terminal device 30 can communicate with the server 10 via the network 40.

The terminal device 30 may be operated by a clerk of a vehicle dealer as shown in FIG. 1. The terminal device 30 may be operated by a customer considering acquiring a vehicle.

The terminal device 30 may include an input device that receives an operation or input performed by a user such as a clerk or a customer. The input device may include, for example, a keyboard or a physical key, may include a touch panel or a touch sensor, and may include a pointing device such as a mouse. The terminal device 30 may output information input thereto to the server 10.

The terminal device 30 may acquire information from the server 10. The terminal device 30 may display the information acquired from the server 10. The terminal device 30 may include a liquid crystal or organic electro-luminescence (EL) display device, an inorganic EL display device, or the like. The terminal device 30 may be connected to an external display device and may cause the external display device to display information.

Example of Operation of Deciding Specifications of Proposed Vehicle

The information processing system 1 may decide the specifications of a vehicle to be proposed to a customer through an operation as described below. The vehicle to be proposed to the customer may also be referred to as a proposed vehicle. The information processing system 1 may decide specifications suitable for the customer as the specifications of the proposed vehicle. Examples of specifications suitable for the customer may include various specifications such as specifications with which the fuel efficiency of a vehicle is improved as much as possible, specifications with which the vehicle becomes less likely to be deteriorated, and specifications with which the convenience of the customer is improved.

The server controller 12 decides the specifications of the proposed vehicle based on traveling data of the first vehicle 20 driven by the customer. There is a high possibility that the traveling data of the first vehicle 20 corresponds to the way in which the customer causes a vehicle to travel in a case where the customer purchases the vehicle. For example, it will be assumed that the server controller 12 has decided specifications, with which fuel efficiency is improved, based on the traveling data of the first vehicle 20. In this case, there is a high possibility that fuel efficiency relating to a case where the customer causes a vehicle having specifications as decided to travel actually is improved. For example, it will be assumed that the server controller 12 has decided specifications, with which a brake pad becomes less likely to wear, based on the traveling data of the first vehicle 20. In this case, there is a high possibility that the brake pad wears less in a case where the customer causes a vehicle having specifications as decided to travel actually.

Examples of the first vehicle 20 may include a vehicle owned by the customer. Examples of the first vehicle 20 may include a vehicle used by the customer for the purposed of business. Examples of the first vehicle 20 may include a rental car rented by the customer.

The server controller 12 may decide whether the specifications of the proposed vehicle are determined such that the specifications are for an electrified vehicle or the specifications of the proposed vehicle are determined such that the specifications are for a conventional vehicle. Examples of the electrified vehicle include an electric vehicle and a hybrid vehicle. The electrified vehicle includes the motor 26 and travels with the motor 26 serving as a drive source. The conventional vehicle includes the engine 28 and travels with the engine 28 serving as a drive source. Examples of the conventional vehicle include a vehicle that needs fuel at the time of traveling like a gasoline vehicle or a diesel vehicle. The conventional vehicle includes no motor 26 that causes a vehicle to travel.

The electrified vehicle may travel with fuel efficiency higher than the conventional vehicle. Meanwhile, the price of the conventional vehicle may be lower than the price of the electrified vehicle. In a case where a profit brought to the customer due to an improvement in fuel efficiency relating to the way in which the customer causes a vehicle to travel is greater than a difference in vehicle price, the server controller 12 may decide the specifications of the proposed vehicle such that the specifications are for the electrified vehicle. In a case where the difference in vehicle price is greater than the profit brought to the customer due to the improvement in fuel efficiency relating to the way in which the customer causes a vehicle to travel, the server controller 12 may decide the specifications of the proposed vehicle such that the specifications are for the conventional vehicle.

In a case where the server controller 12 decides the specifications of the proposed vehicle such that the specifications are for the electrified vehicle, the server controller 12 may decide the specifications of the proposed vehicle to further include a regenerative brake. The server controller 12 may decide the specifications of the proposed vehicle such that the motor 26 functions as a regenerative brake. The server controller 12 may decide the specifications of the proposed vehicle such that a motor that functions as a regenerative brake is provided separately from the motor 26.

In the case of a vehicle having specifications including a regenerative brake, the vehicle may travel with high fuel efficiency and a brake pad is less likely to wear. Meanwhile, the price of a vehicle having specifications including no regenerative brake may be lower than the price of the vehicle having specifications including the regenerative brake. In a case where a profit brought to the customer due to an improvement in fuel efficiency relating to the way in which the customer causes a vehicle to travel or an increase in life span of the brake pad is greater than a difference in vehicle price, the server controller 12 may decide the specifications of the proposed vehicle to include a regenerative brake. In a case where the difference in vehicle price is greater than the profit brought to the customer due to the improvement in fuel efficiency relating to the way in which the customer causes a vehicle to travel or the increase in life span of the brake pad, the server controller 12 may decide the specifications of the proposed vehicle to include no regenerative brake.

In a case where the server controller 12 decides the specifications of the proposed vehicle such that the specifications are for the electrified vehicle, the server controller 12 may decide the charging capacity of the battery 25 as the specifications of the proposed vehicle. The larger the charging capacity of the battery 25 is, the heavier the vehicle may be, and the higher the price of the vehicle may be. An increase in vehicle weight may deteriorate fuel efficiency. Meanwhile, the smaller the charging capacity of the battery 25 is, the shorter a distance by which the vehicle can travel without being charged is. The server controller 12 may decide the charging capacity of the battery 25 such that a profit brought to the customer traveling by the proposed vehicle is increased. The server controller 12 may decide the charging capacity of the battery 25 such that the convenience of the customer traveling by the proposed vehicle is improved.

Acquisition of Traveling Data

The server controller 12 acquires traveling data of the first vehicle 20 driven by the customer. The server controller 12 may decide the specifications of the proposed vehicle based on the traveling data of the first vehicle 20.

The server controller 12 acquires information for specifying the first vehicle 20 driven by the customer from among a large number of vehicles. The information for specifying the first vehicle 20 driven by the customer may also be referred to as vehicle specifying information. The vehicle specifying information may include information for specifying the customer. The information for specifying the customer may also be referred to as customer information. The server controller 12 may specify the first vehicle 20 driven by the customer based on the vehicle specifying information and acquire traveling data from a vehicle specified as the first vehicle 20. The server controller 12 may acquire traveling data of various vehicles and extract the traveling data of the first vehicle 20 from the acquired traveling data based on the vehicle specifying information.

The server controller 12 may acquire information relating to a brake during traveling of the first vehicle 20, as the traveling data of the first vehicle 20. The server controller 12 may decide whether the specifications of the proposed vehicle are determined such that the specifications are for an electrified vehicle or the specifications of the proposed vehicle are determined such that the specifications are for a conventional vehicle based on the information relating to the brake during traveling of the first vehicle 20. The server controller 12 may decide whether to determine the specifications of the proposed vehicle to further include a regenerative brake based on the information relating to the brake during traveling of the first vehicle 20.

The information relating to the brake may include the number of times that the customer has applied the brake while the first vehicle 20 is traveling. The information relating to the brake may include the number of times that the customer has applied the brake during a period of time in which the first vehicle 20 travels by a unit distance. The server controller 12 may decide the specifications of the proposed vehicle such that the specifications are for the electrified vehicle in a case where the customer applies the brake a predetermined number of times or more during a period of time the first vehicle 20 travels by the unit distance. The information relating to the brake may include an average braking distance of the customer applying the brake. The average braking distance corresponds to the average of distances by which the first vehicle 20 travels in a period of time between when the customer applies the brake once and when the customer applies the brake next. The server controller 12 may decide the specifications of the proposed vehicle such that the specifications are for the electrified vehicle in a case where the average braking distance is shorter than a predetermined distance. The predetermined distance may be set to an average distance between traffic signals in an urban area, for example. However, the predetermined distance is not limited thereto and may be set to various values. Regarding the way in which the customer drives a vehicle, the more frequently a brake is applied, the greater the merit of improvement in fuel efficiency for the customer driving an electrified vehicle may be.

In a case where the first vehicle 20 includes a regenerative brake, the server controller 12 may acquire the number of times of operation of the regenerative brake in the first vehicle 20 as the information relating to the brake. The server controller 12 may decide whether the specifications of the proposed vehicle are determined such that the specifications are for an electrified vehicle or the specifications of the proposed vehicle are determined such that the specifications are for a conventional vehicle based on the number of times of operation of the regenerative brake. The server controller 12 may decide whether the specifications of the proposed vehicle are determined such that the specifications are for an electrified vehicle or the specifications of the proposed vehicle are determined such that the specifications are for a conventional vehicle based on a ratio of the number of times of operation of the regenerative brake to the number of times of application of the brake in the first vehicle 20 performed by the customer. In a case where the ratio of the number of times of operation of the regenerative brake is equal to or greater than a predetermined percentage, the server controller 12 may decide the specifications of the proposed vehicle such that the specifications are for the electrified vehicle. The predetermined percentage may be set based on comparison between the degree of reduction in fuel consumption that can be achieved with introduction of the regenerative brake and the cost for introducing the regenerative brake. The predetermined percentage may be set to 50%, for example. However, the predetermined percentage is not limited thereto and may be set to various values. Regarding the way in which the customer drives a vehicle, the more frequently the regenerative brake is operated, the greater the merit of improvement in fuel efficiency for the customer driving an electrified vehicle may be.

The server controller 12 may acquire the magnitude of energy recovered by the regenerative brake as the information relating to the brake. The server controller 12 may decide whether the specifications of the proposed vehicle are determined such that the specifications are for an electrified vehicle or the specifications of the proposed vehicle are determined such that the specifications are for a conventional vehicle based on the magnitude of energy recovered by the regenerative brake. In a case where the magnitude of energy recovered by the regenerative brake is equal to or greater than a predetermined value, the server controller 12 may decide the specifications of the proposed vehicle such that the specifications are for the electrified vehicle. The predetermined value may be set based on comparison between the degree of reduction in fuel consumption that can be achieved with introduction of the regenerative brake and the cost for introducing the regenerative brake. The predetermined value may be set to various values. Regarding the way in which the customer drives a vehicle, the greater the magnitude of energy recovered by the regenerative brake is, the greater the merit of improvement in fuel efficiency for the customer driving an electrified vehicle may be.

In a case where the first vehicle 20 includes no regenerative brake, the server controller 12 may calculate, based on the traveling data of the first vehicle 20, the number of times of operation of a regenerative brake that is expected to be made if the first vehicle 20 includes the regenerative brake. That is, the server controller 12 may calculate the number of times that a condition for operation of the regenerative brake is satisfied, based on the traveling data of the first vehicle 20. In a case where the ratio of the number of times that the condition for operation of the regenerative brake is satisfied to the number of times of application of the brake in the first vehicle 20 is equal to or greater than a predetermined percentage, the server controller 12 may decide the specifications of the proposed vehicle such that the specifications are for the electrified vehicle. The predetermined percentage may be set based on comparison between the degree of reduction in fuel consumption that can be achieved with introduction of the regenerative brake and the cost for introducing the regenerative brake. The predetermined percentage may be set to 50%, for example. However, the predetermined percentage is not limited thereto and may be set to various values. Regarding the way in which the customer drives a vehicle, the more frequently the regenerative brake is operated, the greater the merit of improvement in fuel efficiency for the customer driving an electrified vehicle may be.

For example, the server controller 12 may acquire, as the traveling data of the first vehicle 20, the degree of acceleration made in a case where the first vehicle 20 decelerates. The greater the absolute value of the degree of acceleration made in a case where the first vehicle 20 decelerates, the faster the speed of the first vehicle 20 decreases. In a case where the absolute value of the degree of acceleration made in a case where the first vehicle 20 decelerates is equal to or smaller than a predetermined degree of acceleration, the server controller 12 may determine that the condition for operation of the regenerative brake is satisfied. The predetermined degree of acceleration may be set to be 0.3 times the degree of gravitational acceleration, for example. The predetermined degree of acceleration may be set such that the predetermined degree of acceleration becomes lower than an upper limit value at which regenerative energy recovered due to deceleration of the first vehicle 20 can be recovered. The predetermined degree of acceleration is not limited to those values and may be set to various other values.

For example, the server controller 12 may acquire, as the traveling data of the first vehicle 20, the speed of the first vehicle 20 at the time of application of the brake in the first vehicle 20 performed by the customer. In a case where the speed at the time of application of the brake in the first vehicle 20 is equal to or lower than a predetermined speed, the server controller 12 may determine that the condition for operation of the regenerative brake is satisfied. The predetermined speed may be set to 20 kilometers per hour, for example. However, the predetermined speed may be set to various other values.

For example, the server controller 12 may acquire, as the traveling data of the first vehicle 20, information indicating whether or not the ABS has been operated at the time of application of the brake in the first vehicle 20. In a case where the ABS has not been operated in the first vehicle 20, the server controller 12 may determine that the condition for operation of the regenerative brake is satisfied.

The server controller 12 may calculate a ratio of the number of times that at least one of a plurality of conditions for operation of the regenerative brake is satisfied to the number of times of application of the brake in the first vehicle 20. The server controller 12 may calculate a ratio of the number of times that all of the conditions for operation of the regenerative brake are satisfied to the number of times of application of the brake in the first vehicle 20. In a case where the calculated ratio is equal to or greater than a predetermined percentage, the server controller 12 may decide the specifications the proposed vehicle such that the specifications are for the electrified vehicle. The predetermined percentage may be set based on comparison between the degree of reduction in fuel consumption that can be achieved with introduction of the regenerative brake and the cost for introducing the regenerative brake. The predetermined percentage may be set to 50%, for example. However, the predetermined percentage is not limited thereto and may be set to various values. Regarding the way in which the customer drives a vehicle, the higher the possibility that the regenerative brake is operated is, the greater the merit of improvement in fuel efficiency for the customer driving an electrified vehicle may be.

The server controller 12 may acquire, as the traveling data of the first vehicle 20, the number of times of stoppage made for a period of time in which the first vehicle 20 travels by a unit distance. In a case where the number of times of stoppage made for the period of time in which the first vehicle 20 travels by the unit distance is equal to or greater than a predetermined number, the server controller 12 may decide the specifications the proposed vehicle such that the specifications are for the electrified vehicle. The predetermined number may be set to the number of traffic signals installed per unit distance in an urban area, for example. However, the predetermined number is not limited thereto and may be set to various values. Since the electrified vehicle can be accelerated by the motor 26 when the electrified vehicle starts to move, the customer is more likely to enjoy the merit of improvement in fuel efficiency. Accordingly, regarding the way in which the customer drives a vehicle, the more frequently a vehicle in a stopped state starts to move, the greater the merit of improvement in fuel efficiency for the customer driving an electrified vehicle may be.

The server controller 12 may acquire, as the traveling data of the first vehicle 20, information relating to the traveling distance of the first vehicle 20. The server controller 12 may decide whether the specifications of the proposed vehicle are determined such that the specifications are for an electric vehicle, the specifications of the proposed vehicle are determined such that the specifications are for a hybrid vehicle, or the specifications of the proposed vehicle are determined such that the specifications are for a conventional vehicle based on the information relating to the traveling distance of the first vehicle 20. The server controller 12 may acquire, as the traveling data of the first vehicle 20, a distance by which the first vehicle 20 travels at one time. The distance by which the first vehicle 20 travels at one time may correspond to a distance by which the first vehicle 20 travels for a period of time between when an ignition is turned on and when the ignition is turned off. The distance by which the first vehicle 20 travels at one time may correspond to a distance by which the first vehicle 20 travels over a plurality of periods of time during which the ignition remains on.

In a case where the distance by which the first vehicle 20 travels at one time is equal to or greater than a predetermined distance, the server controller 12 may decide the specifications of the proposed vehicle such that the specifications are for the conventional vehicle or the hybrid vehicle. The predetermined distance may be set to the average cruising range of the electric vehicle, for example. However, the predetermined distance is not limited thereto and may be set to various values. The average cruising range of the conventional vehicle or the hybrid vehicle may be greater than the average cruising range of the electric vehicle. Regarding the way in which the customer drives a vehicle, the longer the traveling distance is, the more the customer may be worried about refueling or charging. For the customer, being able to travel without worrying about refueling or charging results in an improvement in convenience of the customer. Therefore, when the server controller 12 decides the specifications of the proposed vehicle such that the specifications are for the conventional vehicle or the hybrid vehicle in a case where the distance by which the first vehicle 20 travels at one time is equal to or greater than the predetermined distance, the convenience of the customer may be improved.

The server controller 12 may acquire, as the traveling data of the first vehicle 20, the average of distances by which the first vehicle 20 travels until passing through a place where the first vehicle 20 can be charged. In a case where the average of distances by which the first vehicle 20 travels until passing through a place where the first vehicle 20 can be charged is smaller than a predetermined distance, the server controller 12 may decide the specifications of the proposed vehicle such that the specifications are for the electrified vehicle. The predetermined distance may be set to a distance by which the first vehicle 20 can travel even after a sign for charging is displayed in the first vehicle 20, for example. However, the predetermined distance is not limited thereto and may be set to various values.

The server controller 12 may decide the charging capacity of the battery 25 to be installed in the proposed vehicle based on the information relating to the traveling distance of the first vehicle 20. The greater the charging capacity of the battery 25 is, the longer a distance by which the customer can travel without worrying about charging. The server controller 12 may decide the specifications of the proposed vehicle such that the longer a distance by which the first vehicle 20 travels at one time, the larger the charging capacity of the battery 25 installed in the proposed vehicle.

Example of Use of Specifications of Proposed Vehicle

The server controller 12 may output, to the terminal device 30, the specifications of the proposed vehicle decided based on various conditions. A clerk may propose a vehicle to the customer based on specifications displayed on the terminal device 30. The customer may examine a vehicle to be acquired based on the specifications displayed on the terminal device 30.

The terminal device 30 may activate an application that displays the specifications of the proposed vehicle based on an operation performed by a user such as a clerk or a customer. The terminal device 30 may acquire information relating to the specifications of the proposed vehicle decided in the server 10. The terminal device 30 may display the acquired information to notify the user such as a clerk or a customer of the specifications of the proposed vehicle.

The terminal device 30 may output information that is needed for the server 10 to decide specifications suitable for the customer as the specifications of the proposed vehicle. The information that is needed for the server 10 to decide the specifications of a vehicle suitable for the customer may also be referred to as needed information. In a case where the terminal device 30 receives a request for the needed information from the server 10, the terminal device 30 may output information to the server 10 in response to the request. The terminal device 30 may receive information input by a user such as a clerk or a customer and may output the input information to the server 10 as at least a portion of the needed information. The needed information may include customer information and may include vehicle specifying information.

Example of Procedure Performed by Information Processing Apparatus

The server controller 12 of the server 10 (information processing apparatus) may perform an information processing method including a procedure as in a flowchart shown in FIG. 3, for example. The information processing method may be realized as an information processing program executed by a processor of the server controller 12 or the like.

The server controller 12 acquires the traveling data of the first vehicle 20 (step S1). It will be assumed that the first vehicle 20 is a vehicle driven by a customer. As described above, the server controller 12 may specify the first vehicle 20 based on customer information or vehicle specifying information and acquire the traveling data of the first vehicle 20.

The server controller 12 analyzes the traveling data of the first vehicle 20 (step S2). Specifically, the server controller 12 may analyze the traveling data of the first vehicle 20 to acquire information relating to the way in which the first vehicle 20 travels or information relating to the way in which the customer drives the first vehicle 20. As described above, the server controller 12 may analyze the traveling data to acquire various items of information such as information relating to a brake in the first vehicle 20 and information relating to a traveling distance.

The server controller 12 decides the specifications of the proposed vehicle (step S3). Specifically, the server controller 12 may decide the specifications of the proposed vehicle based on the result of analysis of the traveling data of the first vehicle 20. The result of analysis of the traveling data of the first vehicle 20 may include various items of information such as information relating to the brake in the first vehicle 20 and information relating to the traveling distance. The server controller 12 may decide whether the specifications of the proposed vehicle are determined such that the specifications are for an electrified vehicle or the specifications of the proposed vehicle are determined such that the specifications are for a conventional vehicle. The server controller 12 may decide whether to determine the specifications of the proposed vehicle to include a regenerative brake. The server controller 12 may decide the charging capacity of the battery 25 to be installed as the specifications of the proposed vehicle.

The server controller 12 outputs the decided specifications to the terminal device 30 (step S4). Specifically, the server controller 12 may output information relating to the specifications of the proposed vehicle. After the procedure in step S4, the server controller 12 terminates processing as in the flowchart shown in FIG. 3.

The terminal device 30 may display the specifications of the proposed vehicle based on information acquired from the server controller 12. A clerk in a vehicle dealer may propose a vehicle suitable for the customer based on the specifications displayed on the terminal device 30. The customer may examine a vehicle to be acquired based on the specifications displayed on the terminal device 30.

With the information processing system 1, the server 10 (information processing apparatus), the information processing method, and the information processing program according to the embodiment, it is possible to make the specifications of a proposed vehicle close to specifications suitable for the way in which the customer causes the proposed vehicle to travel. In addition, since whether or not the specifications of the proposed vehicle are determined such that the specifications are for an electrified vehicle is decided, the customer is more likely to enjoy the merit of improvement in fuel efficiency. As a result, an improvement in convenience of the customer may be achieved.

The embodiment of the present disclosure has been described based on the drawings and examples. However, it should be noted that various changes or modifications can be easily made by those skilled in the art based on the present disclosure. Accordingly, those changes or modifications should be construed as being included within the scope of the present disclosure. For example, the functions or the like included in each step can be rearranged without logical inconsistency, and a plurality of steps can be combined with each other or be divided.

What is claimed is:

1. An information processing apparatus comprising:
a server including:
a controller configured to determine specifications of a proposed vehicle to be proposed to a customer, and
a storage device in communication with the controller;
an in-vehicle control device configured to:
wirelessly communicate with the controller, and
transmit data regarding a traveling vehicle driven by the customer to the server, the specifications of the proposed vehicle to be proposed to the customer are based on traveling data of the vehicle driven by the customer such that the data gathered corresponds to the way in which the customer causes a vehicle to travel when the vehicle is purchased and the specifications of the proposed vehicle to improve fuel efficiency and a reduction in brake pad wear based on the traveling data,
wherein the controller is configured to:
determine specifications of the proposed vehicle to be proposed to the customer such that the specifications are for an electrified vehicle based on traveling data of the vehicle driven by the customer and outputs the determined specifications, and
determine the specifications of the proposed vehicle to include a regenerative brake.

2. The information processing apparatus according to claim 1, wherein the controller acquires, as the traveling data, a degree of acceleration made in a case where the customer applies a brake.

3. The information processing apparatus according to claim 1, wherein the controller acquires, as the traveling data, information indicating whether or not an ABS has been operated at a time of application of a brake performed by the customer.

4. The information processing apparatus according to claim 1, wherein the controller acquires, as the traveling data, a speed at a time of application of a brake performed by the customer.

5. The information processing apparatus according to claim 1, wherein the controller decides, based on a ratio of the number of times that at least one of a condition that an absolute value of a degree of acceleration made in a case where the customer applies a brake is equal to or smaller than a predetermined degree of acceleration, a condition that an ABS is operated at a time of application of the brake performed by the customer, and a condition that a speed at a time of application of the brake performed by the customer is equal to or lower than a predetermined speed is satisfied to the number of times of application of the brake performed by the customer, the specifications of the proposed vehicle in a case where the vehicle driven by the customer includes no regenerative brake.

6. The information processing apparatus according to claim 1, wherein the controller decides, based on a ratio of the number of times of operation of the regenerative brake to the number of times of application of a brake performed by the customer, the specifications of the proposed vehicle in a case where the vehicle driven by the customer includes the regenerative brake.

7. The information processing apparatus according to claim 1, wherein the controller decides a charging capacity of a battery to be installed in the proposed vehicle.

8. The information processing apparatus according to claim 7, wherein the controller decides the charging capacity of the battery based on the traveling data that includes a traveling distance during a period of time between when an ignition of the vehicle driven by the customer is turned on and when the ignition is turned off.

9. An information processing system comprising:
the information processing apparatus according to claim 1; and
a terminal device,
wherein the terminal device notifies a user of information relating to the specifications of the proposed vehicle output by the controller of the information processing apparatus.

10. An information processing method comprising:
determining, by a controller of a server, specifications of a proposed vehicle to be proposed to a customer;
transmitting wirelessly to the controller, by an in-vehicle control device, data regarding a traveling vehicle driven by the customer to the server, the specifications of the proposed vehicle to be proposed to the customer are based on traveling data of the vehicle driven by the customer such that the data gathered corresponds to the way in which the customer causes a vehicle to travel when the vehicle is purchased and the specifications of the proposed vehicle to improve fuel efficiency and a reduction in brake pad wear based on the traveling data;
determining, by the controller, specifications of the proposed vehicle to be proposed to the customer such that the specifications are for an electrified vehicle by an information processing apparatus based on traveling data of the vehicle driven by the customer;
outputting, by the controller, the determined specifications by the information processing apparatus; and
determining, by the controller, the specifications of the proposed vehicle to include a regenerative brake by the information processing apparatus.

11. The information processing method according to claim 10, further comprising acquiring, as the traveling data, a degree of acceleration made in a case where the customer applies a brake by the information processing apparatus.

12. The information processing method according to claim 10, further comprising acquiring, as the traveling data, information indicating whether or not an ABS has been operated at a time of application of a brake performed by the customer by the information processing apparatus.

13. The information processing method according to claim 10, further comprising acquiring, as the traveling data, a speed at a time of application of a brake performed by the customer by the information processing apparatus.

14. The information processing method according to claim 10, further comprising deciding, based on a ratio of the number of times that at least one of a condition that an absolute value of a degree of acceleration made in a case where the customer applies a brake is equal to or smaller than a predetermined degree of acceleration, a condition that an ABS is operated at a time of application of the brake performed by the customer, and a condition that a speed at a time of application of the brake performed by the customer is equal to or lower than a predetermined speed is satisfied to the number of times of application of the brake performed by the customer, the specifications of the proposed vehicle by the information processing apparatus in a case where the vehicle driven by the customer includes no regenerative brake.

15. The information processing method according to claim 10, further comprising deciding, based on a ratio of the number of times of operation of the regenerative brake to the number of times of application of a brake performed by the customer, the specifications of the proposed vehicle by the information processing apparatus in a case where the vehicle driven by the customer includes the regenerative brake.

16. The information processing method according to claim 10, further comprising deciding a charging capacity of a battery to be installed in the proposed vehicle by the information processing apparatus.

17. The information processing method according to claim 16, further comprising deciding the charging capacity of the battery by the information processing apparatus based on the traveling data that includes a traveling distance during a period of time between when an ignition of the vehicle driven by the customer is turned on and when the ignition is turned off.

18. A non-transitory computer-readable recording medium storing an information processing program causing a processor of a server controller of an information processing apparatus to execute operations including:
determining specifications of a proposed vehicle to be proposed to a customer;
receiving wirelessly, from an in-vehicle control device, data regarding a traveling vehicle driven by the customer, the specifications of the proposed vehicle to be proposed to the customer are based on traveling data of the vehicle driven by the customer such that the data gathered corresponds to the way in which the customer causes a vehicle to travel when the vehicle is purchased and the specifications of the proposed vehicle to improve fuel efficiency and a reduction in brake pad wear based on the traveling data;
determining specifications of the proposed vehicle to be proposed to the customer such that the specifications are for an electrified vehicle based on traveling data of the vehicle driven by the customer;

outputting the decided specifications; and determining the specifications of the proposed vehicle to include a regenerative brake by the information processing apparatus.

\* \* \* \* \*